US006560648B1

(12) United States Patent
Dunn et al.

(10) Patent No.: US 6,560,648 B1
(45) Date of Patent: May 6, 2003

(54) METHOD AND APPARATUS FOR NETWORK LATENCY PERFORMANCE MEASUREMENT

(75) Inventors: James M. Dunn, Ocean Ridge, FL (US); Edith H. Stern, Boca Raton, FL (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/294,279

(22) Filed: Apr. 19, 1999

(51) Int. Cl.[7] ............................................. G06F 15/173
(52) U.S. Cl. .................... 709/224; 709/223; 709/224; 714/22; 455/41
(58) Field of Search ................................... 709/223, 233, 709/105, 224, 250; 714/22; 712/27; 463/42; 455/41

(56) References Cited

U.S. PATENT DOCUMENTS

| | | | | |
|---|---|---|---|---|
| 5,734,865 A | * | 3/1998 | Yu ............................... | 709/250 |
| 5,740,346 A | * | 4/1998 | Wicki et al. ................... | 714/22 |
| 5,764,912 A | * | 6/1998 | Rosborough ................ | 709/224 |
| 5,781,449 A | * | 7/1998 | Rosborough ................ | 709/224 |
| 6,012,096 A | * | 1/2000 | Link et al. ................... | 709/233 |
| 6,038,599 A | * | 3/2000 | Black et al. ................. | 709/223 |
| 6,061,722 A | * | 5/2000 | Lipa et al. ................... | 709/224 |
| 6,092,178 A | * | 7/2000 | Jindal et al. ................. | 712/27 |
| 6,321,264 B1 | * | 11/2001 | Fletcher et al. ............. | 370/252 |

FOREIGN PATENT DOCUMENTS

| JP | 09046396 A | * | 2/1997 | ........... | H04L/29/14 |
|---|---|---|---|---|---|

* cited by examiner

Primary Examiner—Ayaz Sheikh
Assistant Examiner—Thu Ha Nguyen
(74) Attorney, Agent, or Firm—Jose Gutman; Fleit, Kain, Gibbons, Gutman & Bongini P.L.

(57) ABSTRACT

A communication system (100) includes a network, a first application running on a first Host computer system (First Host) (102) coupled to the network, and a second application running on a second Host computer system (Second Host) (122) coupled to the network. The first application issues an Extended PING command (300) for sending an Extended ECHO message (380) from the First Host (102) into the network and directed to the second application in the Second Host (122). The second application in the Second Host (122), in response to receiving the Extended ECHO message (380), issues an Extended PING command (300) for sending an Extended ECHO reply message (380) into the network and directed to the first application to measure the full loop-back network latency of communicating a message application-to-application across the network.

20 Claims, 9 Drawing Sheets

PING COMMAND:

$$\text{PING} \begin{bmatrix} \text{-d} & \text{-r} \\ \text{-n} & \text{-v} \\ \text{-q} & \text{-R} \end{bmatrix} \begin{bmatrix} \text{-c} \end{bmatrix} \begin{bmatrix} \text{-i} \\ \text{-f} \end{bmatrix} \begin{bmatrix} \text{I} \end{bmatrix} \begin{bmatrix} \text{-p} \end{bmatrix} \begin{bmatrix} \text{-s} \end{bmatrix} \begin{bmatrix} \text{A*} \end{bmatrix}$$

310 FLAGS:
- -d  SOCKET LEVEL DEBUG
- -n  NUMERIC ADDRESSING OF HOST
- -r  DIRECT NETWORK CONNECTED ROUTE
- -v  VERBOSE OUTPUT
- -q  QUIET OUTPUT
- -R  RECORD ROUTE OPTIONS 320
330 COUNT:        -c  NUMBER OF PINGS TO SEND
340 WAIT:         -i  WAIT BETWEEN PING REQUESTS
                  -f  FLOOD AS RAPIDLY AS POSSIBLE
350 PRELOAD:      -I  PRELOAD A NUMBER OF PINGS
360 PATTERN:      -p  PADDING PATTERN TO USE
    PACKET:       -s  BYTE COUNT OF PING SIZE

370 *NEW FIELD
    APPLICATION:  -A  PORT ID OF THE FAR-END APPLICATION

NETWORK LATENCY MEASUREMENT
ECHO OR ECHO REPLY MESSAGE (1)

TYPE =        8 FOR ECHO MSG
              0 FOR ECHO REPLY MSG

CODE =        0

CHECKSUM =    RFC 792 SPECIFIED METHOD FOR
              CALCULATING CHECKSUM

IDENTIFIER =  RETURN VALUE SENT

SEQUENCE # =  RETURN VALUE SENT

DATA =        CURRENTLY OPTIONAL

380

METHOD AND APPARATUS FOR NETWORK LATENCY PERFORMANCE MEASUREMENT

BACKGROUND OF THE INVENTION

1. Field of the Invention

This invention relates in general to computer networking, and more particularly to network communication latency measurement relating to Internet communication.

2. Description of the Prior Art

Today, when an end user or any application under program control wants to use a network, such as the Internet, there is really only two basic kinds of attributes it can detect about the network. It can detect whether the network is operational and if the network has an actual connection to a far end destination across the network. The way it is usually done is with a standard command called "PING".

An application communicates with an underlying operating system to issue the PING command, and normally also issuing an associated ECHO command, to send a token message across the network. If the token message makes it to the far end destination and an echo token message returns back to the originating computer, one would determine that the network was connected and at least usable.

The other standard command is called "ROUTE TRACE", which identifies all intermediate network nodes traversed by a token message sent across the network. For instance, the ROUTE TRACE command will identify all the routers, by router address, that handled a token message traversing across the network. So, one can map a possible path traversed by a token message across the network from the result of the ROUTE TRACE command. But, that is about all the information provided by the ROUTE TRACE command.

In summary, by using the PING command one can identify that both ends across the network are connected and operational. Further, by using the ROUTE TRACE command one can roughly approximate a route that a token message may take to traverse the network.

Additionally, utilizing a PING command one could approximate a total time elapsed from a time when the PING command was issued to a time when the PING command has returned with a value. This would approximate a total time for a token message to travel round-trip across the network. However, there are at least two problems with this approach.

First, the PING command issues a token message from the lower layers of the operating system. The token message truly does not travel end to end across the network— including the latency up to and including the application layer of a computer system at each end of the network. The token message typically only travels from the middle of the operating system stack in the originating side, through the network, and up to the middle of the operating system stack on the terminating side, but not up all the way up to the terminating side application. This measures only Host-to-Host message communication but not application-to-application message communication, i.e., not all the way up through the application layer of a stack on a computing platform or Host.

Secondly, the PING command, as normally used today, is not a long or variable length message. The PING command typically issues a 56 byte token message, which is a very small packet for a network such as the Internet. For example, typical e-mail packets include thousands of bytes per packet. Video packets tend to be even bigger yet. So, the fact that a small packet can traverse the network in a timely fashion is not indicative of the fact that a large packet could also traverse the network in a timely fashion. In truth it is counter-indicative. Most routers have different queues for different kinds of messages, based on size and priority. The token messages from PING commands are high priority, small size messages and they tend to get handled much quicker through the routers. The larger message packets and the lower priority message packets tend to get handled last.

So, the fact that a token message from a PING command makes it through the network doesn't mean that another message will also make it through. At least not in the time frame one might expect.

Accordingly, there is a need for a method and apparatus to eliminate those specific disadvantages of the prior art as discussed above, and particularly so that an application and an end user can determine that the application is communicating messages across the network with another application at a latency rate adequate to accomplish an intended job within its timing requirements.

BRIEF DESCRIPTION OF THE DRAWINGS

FIG. 3A is a diagram illustrating a PING command expression according to a preferred embodiment of the present invention.

DESCRIPTION OF A PREFERRED EMBODIMENT

This invention solves the problems of the prior art by allowing a high level application software, which one would normally consider as a layer 7 application under the OSI reference model, to measure message communication latency across a network using a measurement that is meaningful to the application. This invention allows an application to discover the network's ability to service communication for that particular application on an end to end basis, that is from layer 7 on an originating side down to the stack, across the network, and up to layer 7 on the terminating side and the Loop-back on the reverse path, and in ways that are meaningful to the application itself. The term "network", whether plural or singular, as used herein, will be representative of a data network, including, but not limited to, the Internet, Intranets, wide area networks, and/or local area networks, and without limitation as to the full scope of the definition of data network as encompassed by the present invention.

This invention solves the problems of the prior art by transparently performing network latency measurement through conventional network infrastructure equipment. Network latency measurement is performed transparently by using standard network protocol and/or Unix commands most of which have optional fields already available in their command structure so that the internal network infrastructure equipment, such as routers and switches, pass those fields as part of a standard message. Routers that are a part of the data network do not need to do anything with the message to identify themselves or to identify how long they worked on the message.

This invention accomplishes an end to end Loop-back test of the network, testing message communication latency all the way through the application layer, with the interconnecting network infrastructure being totally transparent. Specifically, this invention mainly focuses on the network messaging latency actually experienced by the edges of the network, e.g., the servers and the applications that attach to the network, and that use the network as a transparent pipe with whatever characteristics it happens to present to the applications at a particular point in time. Accordingly, this invention achieves the end to end testing while utilizing existing messaging formats across the network to achieve transparency, as will be discussed in more detail below.

Figure 1:
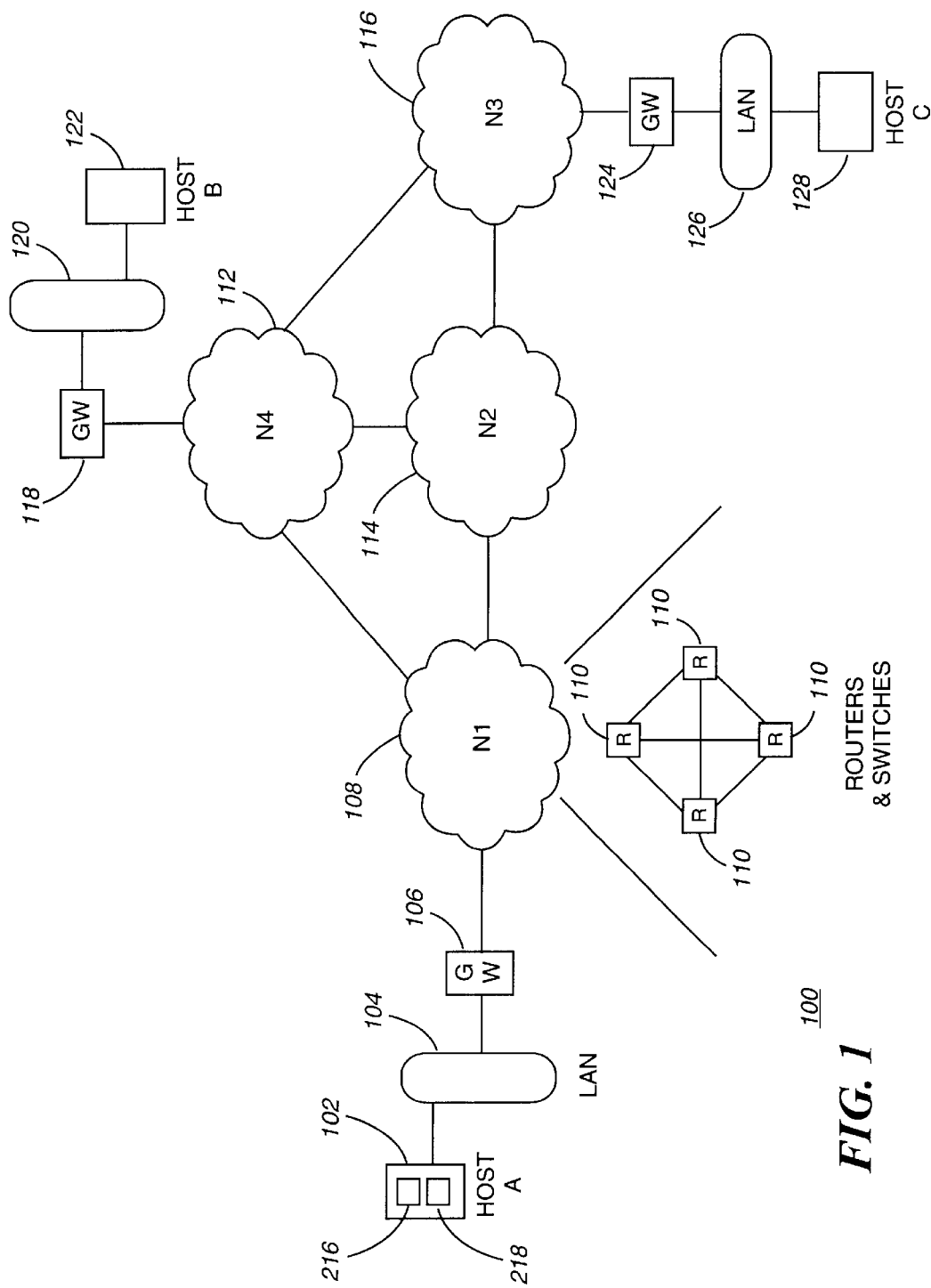
FIG. 1 is a block diagram of a communication system according to a preferred embodiment of the present invention.

FIG. 1, shows a typical Internet protocol (IP) based network. The IP network is used for exemplary discussion purposes because most people are familiar with the IP network model. However, the benefits of the present invention are not limited to IP based networks, and can be obtained for any data network as encompassed by the present invention. For exemplary discussion purposes, therefore, the network at least partly uses IP communication protocol, such as the Internet, Intranet, and/or any of the IP based networks.

FIG. 1 shows a collection of clouds labeled network 1, 2, 3 and 4, elements 108, 114, 116 and 112 which are interconnected to a form matrix of interconnected networks, such as normally found in the Internet and most IP based networks. The Internet is such a network of computers and computer networks linked worldwide. As can be seen in FIG. 1, there are multiple routes through the network infrastructure for communicating message blocks between host computer systems. If a piece of network equipment fails, for instance inside element 108 network N1, then the computer system labeled Host A, element 102, messages are not going anywhere in the network. However, if a piece of equipment inside network N2, element number 114, fails, at least network N1, element 108, has another route to get the message from Host A 102 around the failed network N2 114.

So, we tend to view that whole network infrastructure as a set of interconnected network clouds, realizing that the network, e.g., the Internet, is similarly comprised of a collection of interconnected networks. The Internet is not one big network. It is thousands of interconnected networks. Network routers 110 constitute one of those networks. Typically each of these networks comprises routers and/or switches that are interconnected so should any one element fail there are other paths for message packets to traverse through the network.

Host A, element 102, as shown is connected to a local area network (LAN), element 104, which is connected to a gateway 106 into the network cloud 108, illustrating an enterprise type connection to the network. If Host A 102 were a household or similar personal computer user site, it would be connected to a modem, for instance, instead of a LAN 104 and the Gateway 106. Gateways typically are enterprise computer boxes that attach from a private network on one end to a more public (or less secure) network, such as the Internet, on the other end. These gateways 106 typically act as a filter and as a gateway and as a bridge to facilitate messages traveling between Host A 102, through the LAN 104 and through the Gateway 106, and into the network cloud 108. The destination, in this example, is intended to be Host B, element 122, which is also attached to its enterprise LAN 120 and its Gateway 118.

How a message gets from Host A 102, the entry point of network cloud N1, element 108, to Host B 122, the exit point at network cloud N4, element 112, depends on the rules of the network provider. The Host and the application don't pick their own routing, so whether an element leaves Gateway 106, goes into N1, element 108, and then goes directly to N4, element 112, and exits to Gateway 118, or whether the message goes into N1, element 108, and then goes to N2, element 114, and then to N4, element 112, or whether it goes to N2, element 114 and then N3, element 116, and then to N4, element 112, depends on the rules of the network provider and those rules typically are dynamic based on the traffic loads within the network clouds and within the links interconnecting the network clouds. A message packet may traverse any available route across the network. Some message packets may directly travel from N1 108 to N4 112. Some message packets may travel from N1 108, then to N2 114, and then to N4 112. Some message packets may travel from N1 108, then to N2 114, then to N3 116, and then to N4 112. The applications have no control over what route message packets take across the network.

Applications send a message through the network via message packets. The message packets can take various routes in the network to arrive at the destination, e.g., at Host B 122. When the message packets arrive at Host B 122, in this example, Host B 122 reassembles the message packets in the correct order to recreate the original message sent from Host A 102. Such message delivery techniques are well known in the prior art.

Host C 128, as shown in FIG. 1, is another exemplary computer system Host connection into the network. Host C 128 can similarly communicate messages back and forth between Host A 102 and Host B 122 through their respective LANS and Gateways and network interconnections based on the needs of the applications running on the respective Hosts.

Each Host computer system includes, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information. The Host A 102, Host B 122, and Host C 128, computer systems in this example include the computers and computer readable medium as discussed above.

An application resident on Host A 102, for instance, may want to know if it can communicate with an application, or application component, resident on Host B 122. Typically, the application on Host A 102 sends a PING command into Host A 102 to cause the token message to be sent into the network, as discussed above. Usually, the application only sends the PING command once to test the network connection to set up a session with Host B 122. Host B 122 responds to the PING command, and the application assumes that communication with an application, or application component, on Host B 122 has been established. After establishing the communication session with Host B 122, the PING command is not normally used again by the application on Host A 102.

Most people recognize that the PING command, as used today, does not provide accurate and current time measurement for network message communication latency because as the network load changes, the message packets may take different routes across the network, such as around network clouds N2 114, N3 116, and then N4 112. As long as the applications are capable of communicating across the network, today, they have to accept the fact that varying network routing will vary the delays for messages to travel across the network without providing the applications any control over this condition. As one can envision, a direct route across the network between Host A 102 and Host B 122 would typically result in much quicker delivery of message packets than packet delivery via a roundabout route. So, application transfers can speed up or slow down, or even stop or pause, based on the varying traffic loads in the network. Applications in the past have not tried to calibrate message packet communication delivery across the network. However, this is one of the significant advantages provided by the present invention, as will be discussed below.

Figure 2:
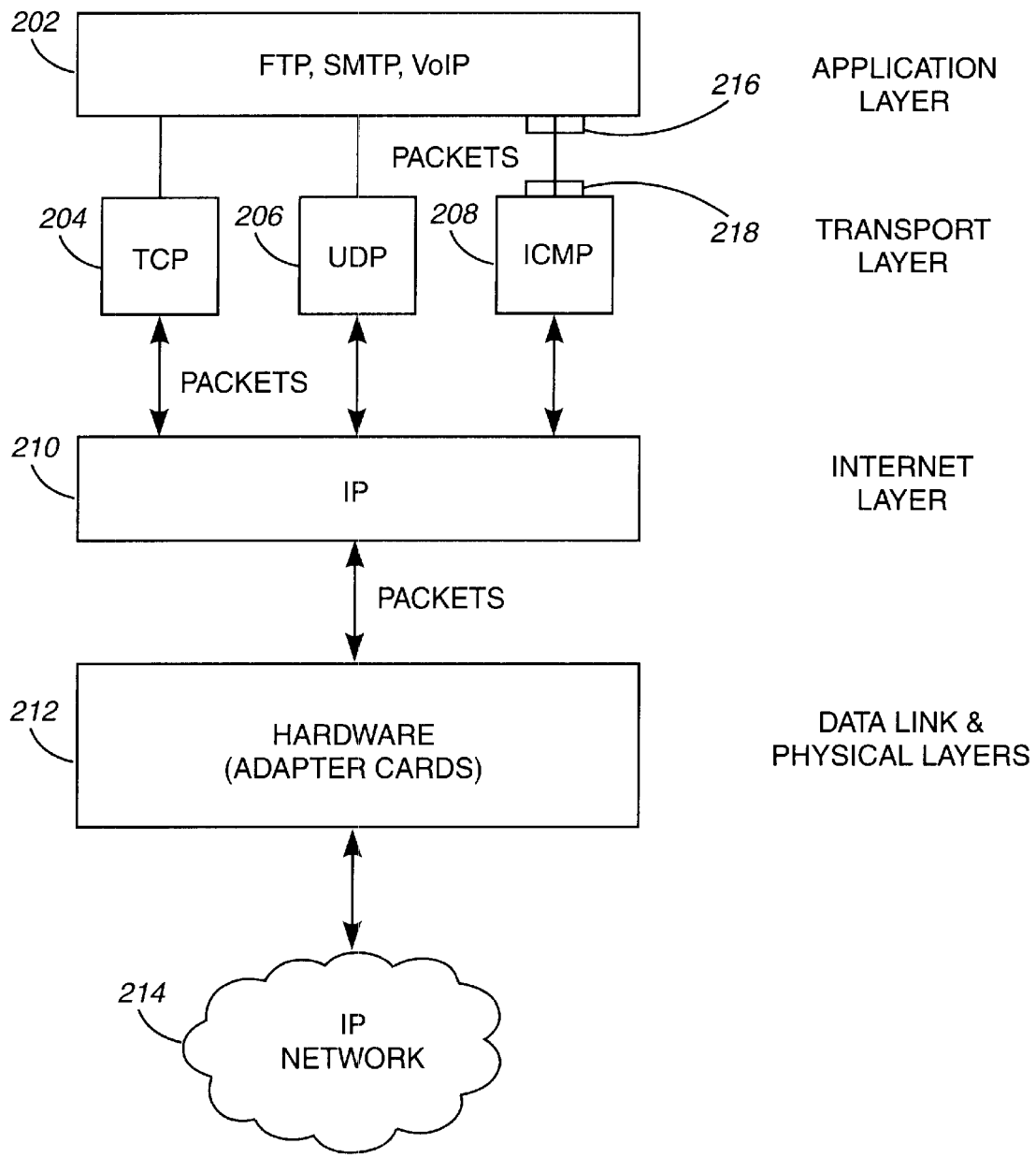
FIG. 2 is a block diagram illustrating communication layers of the communication system of FIG. 1 according to a preferred embodiment of the present invention.

FIG. 2 illustrates an exemplary communications software and hardware stack, in accordance with the OSI model. The OSI model is a well known standard that depicts layers of software and hardware stacked on top of each other to provide a structured set of functions in a communication system such as commonly used in the network. At the bottom layer, at element 214, is the physical network infrastructure discussed above with reference to FIG. 1. This physical network infrastructure may be directly connected to a Host computer system, as depicted in FIG. 2, or may also embody a LAN and a Gateway as is more accurately depicted in FIG. 1.

The hardware card 212, such as an Ethernet card or token ring card or another similar network connection mechanism, handles the building of the data packets and the physical attributes of the network, such as signal voltages, currents, etc. This low level network hardware interface is well known in the art.

The next layer up is the Internet protocol (IP) layer. This is a layer of software that is commercially available such as part of a software platform for a host computing system. For example, it is normally embedded in an operating system platform such as Unix or Windows 95.

The next layer up is a transport layer. The transport layer, in this example, comprises at least three transport protocols 204, 206 and 208. A transport layer protocol typically wraps a message for delivery through the network.

The top layer, element 202, is the application layer. It handles application communication functions such as file transfer program FTP, or such as mail transfer program, like SMTP. Each of those programs in the application layer 202 have particular message packet formats.

The transport layer elements 204, 206, 208, and particularly with respect to elements 204 and 206, interoperate with the application layer 202 to wrap messages in a needed packet format based on whichever application is requesting for their assistance. The ICMP transport protocol block 208 is an Internet message protocol that issues token messages in response to the PING command, and an ECHO message, as will be more fully discussed below.

Those commands can also be issued from an operating system, such as the Unix or the Windows 95, for instance. These operating system functional components typically reside at least in part at the Internet layer 210 and at the Data Link layer 212.

As an example, an application operating in the application layer 202 may require to communicate with an application, or application component, resident on a distant Host across the network. For example, a mailing application, such as an SMTP application, accepts a user's input to create an e-mail message. The mail application then puts the e-mail message into a particular message format unique to the application. Then, continuing with the example, the computer system calls on a TCP 204 transport protocol which wraps the e-mail message for transmission via the network. Then, the computer system calls the IP layer 210, which wraps the e-mail message again, and which then hands the message down to the hardware and data link layer 212. The hardware and data link layer 212 then transfers the message into the Internet, for example.

When the message traverses the network and reaches the far end, i.e., the receiving Host, the message wrapping process is reversed and each of those wrappers containing routing information that are unique to the respective layer that put it on the message now takes it off. That is how an application knows how to find its other half somewhere in the network. These wrapping and unwrapping functions constitute techniques that are well known in Unix and in IP programming.

With reference now to FIG. 1 and FIG. 2, we will discuss two functional components labeled 216 and 218 that reside in each Host, in accordance with a preferred embodiment of the present invention. An Appender 216 resides in the application layer 202 layer in a Host computer system. Further, a Stripper 218 resides in the transport layer in a Host. Preferably, the Stripper 218 functionally couples the ICMP transport protocol block 208 with the application layer 202 and the Appender 216.

Additionally, in accordance with the present invention, an Extended PING command will be used to report message communication times and network latency performance measurements for the network, as will be discussed below.

With reference to FIG. 2, block 208, the underlying operating system, such as Unix and Windows, provides a conventional PING command today. However, in accordance with the present invention, an Extended PING command, as shown in FIG. 3A, provides additional functional features to measure network latency and to provide other significant advantages over the prior art basic PING command, as will be discussed below.

As shown in FIG. 3A, the Extended PING command 300 provides an additional parameter element 302 that is not found in a conventional PING command. The additional parameter element 302 will be discussed in detail below. However, it is important to note that the other parameter flags and fields 310, 320, 330, 340, 350, and 360, as shown in FIG. 3A, are normally available in the conventional PING command. The additional parameter element 302 comprises an Application field 370 that identifies the application residing on a Host across the network, typically identified by a Port ID. With this additional information, i.e., the Application field 370, available in the Extended PING command 300 an application residing on a Host can identify an application, or application component, resident on another Host across the network to perform network latency measurements, as will be discussed below.

Typically, an application issues a Extended PING command 300 and gets back from the Extended PING command 300 at least a time stamp value indicating a time period for completion of a message packet loop back test, e.g., from the originating application to the destination application residing on a Host across the network and back to the originating application. Optionally, other values are available as a result of the Extended PING command 300 such as available from the other flags and fields 310, 320, 330, 340, 350, and 360.

A conventional PING command is normally processed by the operating system on the Host, and then the operating system at the Host issues an ECHO message, and the operating system at the remote Host issues an ECHO reply message. On the other hand, an Extended PING command 300 results in an Extended ECHO message and an Extended ECHO reply message.

Figure 3B:
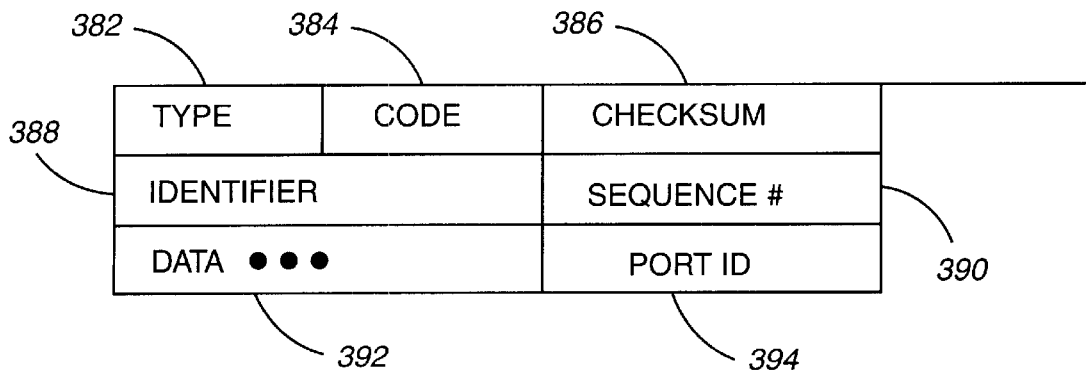
FIG. 3B is a block diagram illustrating an ECHO, or ECHO Reply, message for use in the communication system of FIG. 1 according to the present invention.

An exemplary Extended ECHO message, or similarly an Extended reply message, is shown in FIG. 3B. The Extended ECHO message includes information flags and fields including TYPE 382, CODE 384, IDENTIFIER 388, CHECKSUM 386, and SEQUENCE NUMBER 390, and a DATA field 392, all as shown and described in FIG. 3B. The DATA field 392 is normally not used when an Echo message is issued from a conventional PING command. Generally, the DATA field 392 has been available for any type of data that may be transmitted along with the ECHO message. However, the Extended PING command 300 issues the Extended ECHO message which includes specific information in the DATA field 392 as discussed below.

An Extended PING command 300 issues an Extended ECHO message that includes a PORT ID field 394 in the DATA field 392. The PORT ID field 394 identifies a destination, such as an application residing at a remote Host across the network. This identification information preferably comprises a PORT ID identifier. In this way, an Extended PING command can issue an Extended ECHO message that can be processed by a destination Host, i.e., across the network, and further can be destined for reception by an application, or application component, resident on the destination Host. This additional destination function was not available in prior art communication systems, such as those utilizing the conventional PING command, and is a significant advantage of the present invention, as will be more fully discussed below.

Additionally, the Extended PING command 300 can store data in the DATA field 392, which is a variable length field, to set the size of a message packet for the Extended ECHO message that is representative of the message packet size for a particular application requiring use of the network communication facilities. In this way, an application can test the network latency for message packets that are of size relevant to the specific application requirements. This is a more realistic measurement of network performance for many applications than simply sending a small token message from the PING command. The small token message is usually handled in a higher priority than other larger message packets in the network. Use of such a small token message actually may provide irrelevant and false network performance information that can not be relied upon by a user of the network other than possibly to verify a connection is established between Host computer systems on the network. Therefore, by using the variable size packet of the ECHO message, and the ECHO reply message, a more relevant measurement of network latency performance is obtained by the communication system 100 in accordance with the present invention.

The ECHO message is what an originating Host sends out into the network as a result of the conventional PING command. The Destination or remote Host then receives the ECHO message from the network. Normally, the ICMP layer 208 or the operating system at the remote Host turns the ECHO message around at that layer and sends back an ECHO reply message into the network. When the originating Host receives the ECHO reply message it generates a result output from the conventional PING command at the originating Host. Therefore, the conventional PING command performs a message communication loop-back test from the middle layer of the operating system of the originating Host out to the middle layer of the operating system of the remote Host and back. This type of loop-back test is also called a Host-to-Host loop-back test, which is normally performed by the conventional PING command. It can also be performed by the Extended PING command 300 to measure Host-to-Host network latency performance, such as with a varying size message packet to measure relevant message packet communication performance for the network, as will be more fully discussed below.

As shown in FIG. 3A, a new field shown as number 302, an originating application identifies where it wants the response to come from. The calling application knows a foreign counterpart application resident on a remote Host across the network. The counterpart application can be identified at least in part by a PORT ID.

So, for example, a voice over IP server and a file transfer protocol server each can be identified by a unique PORT ID. Likewise, for example, an electronic mail program and a voice program or file transfer program each can be identified by a unique PORT ID. An application, therefore, can transfer a PORT ID information to an Extended PING command 300 which, as shown in FIG. 2, operates from the application layer 202. The Extended PING command 300 passes information, in part, to the Appender 216 component in the application layer. The Appender 216 passes the PORT ID information from the Extended PING command 300 down to the Stripper 218 component in the ICMP layer 208. The Stripper 218 component uses the PORT ID information from the Extended PING command 300 to create at least in part the PORT ID field 394 in the DATA field 392 of the Extended ECHO message 380. The ICMP block 208 completes the creation of the other fields of the Extended ECHO message with other appropriate pipe codes and so forth according to how it handles the PING command. Note that because the PORT ID field 394 in the DATA field 392 of the Extended ECHO message 380 appears to be part of a ECHO message or conventional ECHO reply message, it passes transparently through "legacy" routers and switches in the network and associated infrastructure equipment without modification to the infrastructure.

The Extended ECHO message 380 then traverses through the network, for example, from Host A 102, as shown in FIG. 1, and then eventually received at Host B. At the ICMP layer 208 in Host B 122 the operational sequence is reversed. The Stripper 218 component strips the PORT ID information from the PORT ID field 394 in the DATA field 392 of the received Extended ECHO message 380 and passes the information to the Appender 216 component which appends the PORT ID information to an Extended PING command 300 message that goes up the stack and is put back into field A 302 and handed up to a terminating application at the remote Host.

The terminating application handles the received Extended PING command 300 message according to the terminating application's internal rules. For example, the rule of the application might be to stop processing and handle the Extended PING command 300 immediately. However, the rule could be that the received Extended PING command 300 is stored in a queue and waits a turn to be handled by the terminating application along with any other traffic the application might be handling. In any case, the originating application will have some sense of the terminating application's rules because it is in effect its counterpart.

Then, the terminating application replies by sending a reply Extended PING command 300 back to the originating application across the network. The terminating application issues a reply Extended PING command 300 at the application layer 202 of the remote Host B 122. There, the Appender 216 block passes the PORT ID information from the reply Extended PING command 300 down to the Stripper 218 component in the ICMP layer 208. The Stripper 218 component uses the PORT ID information from the reply Extended PING command 300 to create at least in part the PORT ID field 394 in the DATA field 392 of the Extended ECHO reply message 380. The ICMP block 208 completes the creation of the other fields of the Extended ECHO reply message with other appropriate pipe codes and so forth according to how it handles the PING command. Then, the operating system in Host B 122 sends the Extended ECHO reply message 380 into the network destined for reception by the originating application in the application layer 202 of the originating Host A 102.

The originator application issued the original Extended PING command 300 and is monitoring messages received at the originating Host A 102 for the Extended ECHO reply message 380. When the Extended ECHO reply message 380 is received at the originating application on the originating Host A 102, a time-stamp information is attached to the message.

The originating application started a PING timer when issuing the Extended PING command 300. When the information from the Extended ECHO reply message 380 is passed up as a result of the Extended PING command the originating application stops the PING timer and can approximate in effect an end-to-end, and application-to-application, message performance measurement of the network.

At this point, the application could post this measurement to a user of the application as an indication of network performance relevant to the performance of the application. Alternatively, the application could compare the result of a contemporaneously issued conventional PING command to indicate whether a bottleneck condition (long delay condition) is due mainly from a server Host processing bottleneck or from a network message communication bottleneck. For instance, the originating application could issue an Extended PING command while also starting a PING timer. When the Extended ECHO reply message returns to the originating Host A 102, the result of the Extended PING command can be passed to the originating application. The Host 102 using the PING timer then time-stamps the loop-back message communication test of the conventional PING command. This in effect characterizes the network and some of the lower layers of the operating system stack in the Host A 102 and in the Host B 122. Now, with two time-stamps the originating application can compare the loop-back delay of the Extended PING command 300, which is the end-to-end, application-to-application delay, with the loop-back delay of the conventional PING command, which is the middle-to-middle layers of the Hosts. By simple subtraction, one now has an approximation for how much delay is mainly network induced and how much delay is mainly server Host induced. Therefore, one can separate application layer bottlenecks from network message transmission bottlenecks.

Over a reasonably long period of time where applications communicate with each other across the network and repeatedly perform performance testing, an approximate average measurement of network latency will tend to show itself. The application can indicate this average latency measurement to a user of the application to provide a continuous network latency monitoring function that a user can rely on for determining whether certain applications, or application components, can optimally operate at any particular point in time.

This network latency performance indication to an application can be periodically updated by the application to a user via a user interface. This is analogous to a speedometer in a car dashboard generally indicating the velocity of a car to the driver. While sensing the Loop-back test over time, an application or a user thereof has some type of indicator that shows what the mean or the average message communication response time for the entire Loop-back across the network for an Extended ECHO message and associated Extended PING command.

Recall that typically a conventional communication system issues the conventional PING command only once at the beginning of an application, for example, just to make sure messages can get across the network and back. The conventional host does not bother anymore to send PING commands for the application.

In accordance with the present invention, a user application typically issues the Extended PING command frequently because that operates to characterize network latency performance like a speedometer of a car sensing velocity of the car. For example, the application could issue an Extended PING command every 10 milliseconds, or every 100 milliseconds, or every second, or every 10 seconds. The application could then indicate to a user the average response time of the network.

Figure 4:
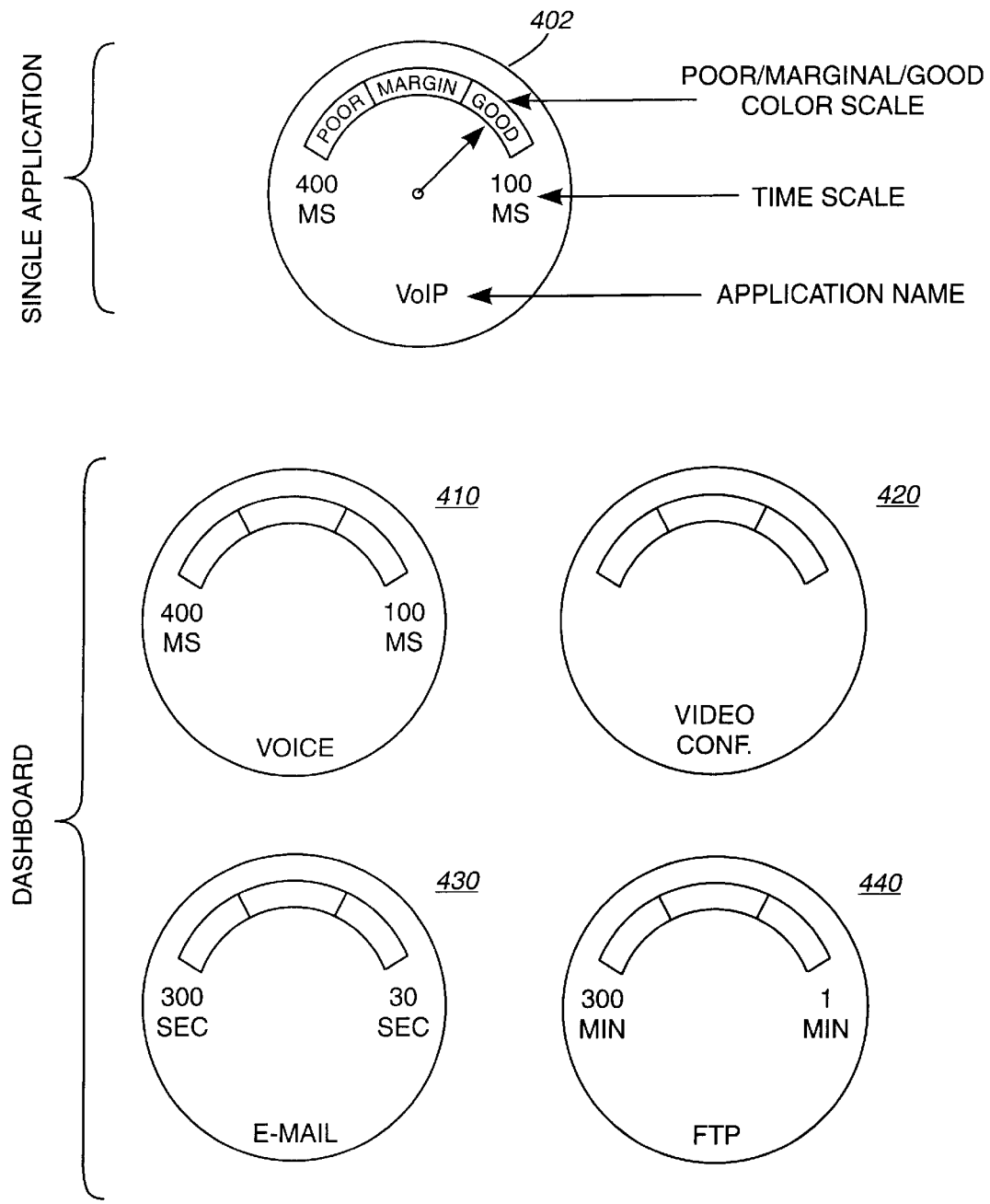
FIG. 4 is a diagram showing exemplary user interface elements for use in accordance with a preferred embodiment of the present invention.

FIG. 4 shows alternative embodiments of exemplary user interfaces as discussed above. For example, an information display to the end user might be useful to indicate why an electronic mail application is operating slow or why a voice over IP phone call sounds bad. FIG. 4 shows, in one example, a single indicator 402 to display this capability. Although it's shown like an analog speedometer, it could just as easily be shown as a digital readout. Alternatively, it could be a color bar, e.g., red, green, and blue bar segments. It also could be color background on a speedometer gauge for poor, marginal and good operating conditions.

The indicator can show only the poor, marginal, and good indication because that's probably all that a typical end user really would want to know. However, the more technically inclined user might also want shown that poor performance comprises a particular numerical time parameter like in this case 400 milliseconds and good performance at a typical time parameter like 100 milliseconds. And of course the user interface would also identify which application by name it characterizing network performance.

If multiple applications were contemporaneously operating, as also shown in FIG. 4, it could separately indicate each application performance with a separate gauge. For example, illustrated are indicators for a voice over IP application 410, a video conferencing application 420, an electronic mail application 430, and a file transfer application 440. A dashboard user interface can hold the collective indicators, as shown. Note that each application indicator is still divided into poor, marginal and good band. A speedometer needle, or some other indicating mechanism, can be used to indicate current performance of each application. In particular, notice that the time scales are different for each application. For instance, the voice over IP application 410 ranges from 400 to 100 milliseconds, which is still critical for voice. However, the electronic mail application 430 might range from 300 seconds to 30 seconds, where 300 seconds might be for poor e-mail performance while 30 seconds might be for very good e-mail performance These indicators provide more than time information. They actually inform a user whether network latency performance meets certain performance requirements for a particular application within a particular time scale. So the indications of good, medium, or bad, is not just a network latency time measured value. It's a time value relative to an particular application performance requirement. The type of measurement and information provided to a user, as discussed above, clearly has not been available for any conventional network, such as by using only conventional PING commands, and is a significant advantage of the present invention.

Other user interface techniques to communicate this information may include, for example, using color to convey performance, e.g., green, yellow, red. Alternatively, we could use audible tones or audible words. Further, the user interface may flash a display screen element to indicate performance transitioning from good to marginal to poor, for instance.

Additionally, an application may have critical performance requirements, such as for voice over IP, where the application itself may have predefined parameters determine whether a call can be established, or maintained, at the present. That is, the application can automatically determine whether a network is available for voice over IP communication and react automatically to changing network conditions. The application could also respond and adjust itself, or do something, to control the changing network situation to allow communication to be conducted even under a degraded network condition.

For instance, you could imagine a video conference which has different categories of resolution of the video. For example, a large packet, lots of this high-quality video when the network is operating efficiently. But, when the network is operating really slow, the application might adjust its video resolution down, such as by skipping alternate frames or by changing the compression ratio, to give the user poorer quality video conferencing while attempting to maintain the connection across the network.

In another example, e-mail messages are stored in a queue of e-mails that need to go out. As the system gets congested, maybe it only sends out the high priority e-mail messages first and holds the other lower priority messages to try to get those across the network, using some type of priority scheme. As another example, e-mail messages that have large attachments may be held until the system sends the e-mail messages without any attachments—the smaller messages.

In summary, FIG. 4 illustrates different exemplary user interfaces for providing information to users as far as different applications that might have certain timing requirements for the network latency performance. Additionally, different applications can use that information to respond automatically within the applications to predefined parameters and change the application operations accordingly to deal with a changing network congestion, such as to avoid a user being significantly inconvenienced or losing a communications link, or to have to intervene in the application's operations.

Figure 5A:
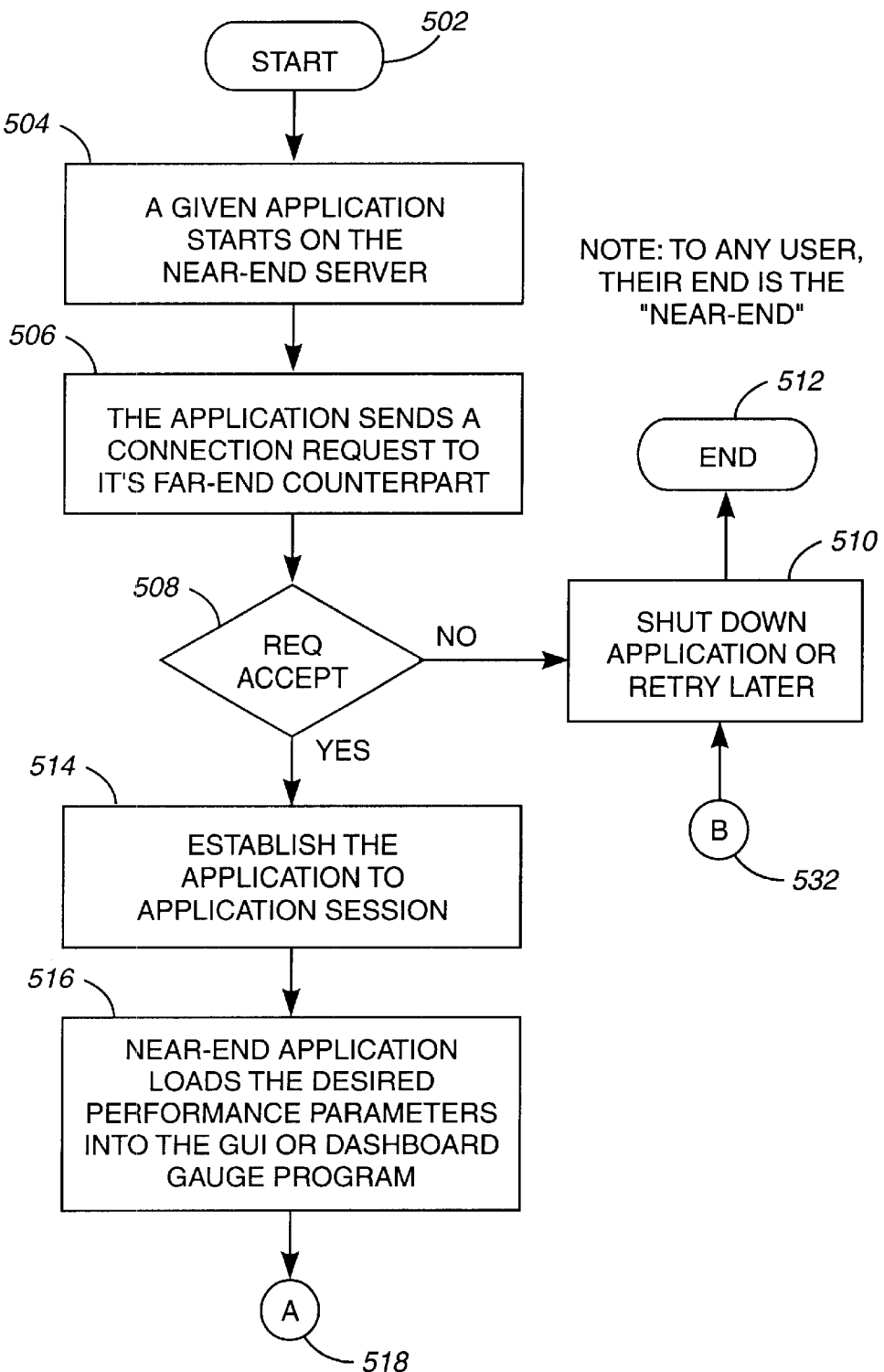
FIGS. 5A, 5B, 5C, and 6, are operational flow diagrams for a communication system according to a preferred embodiment of the present invention.
Figure 5B:
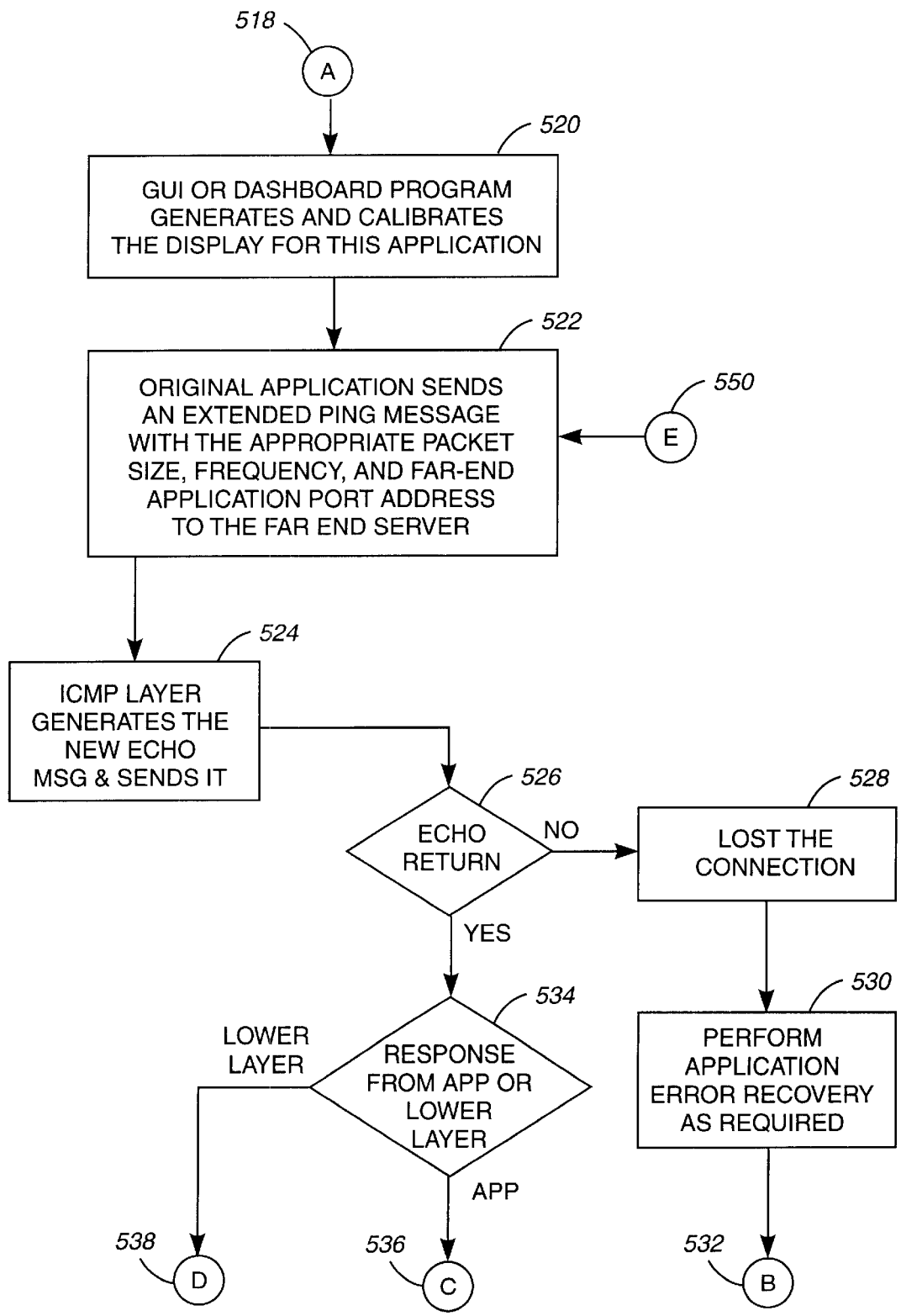
Figure 5C:
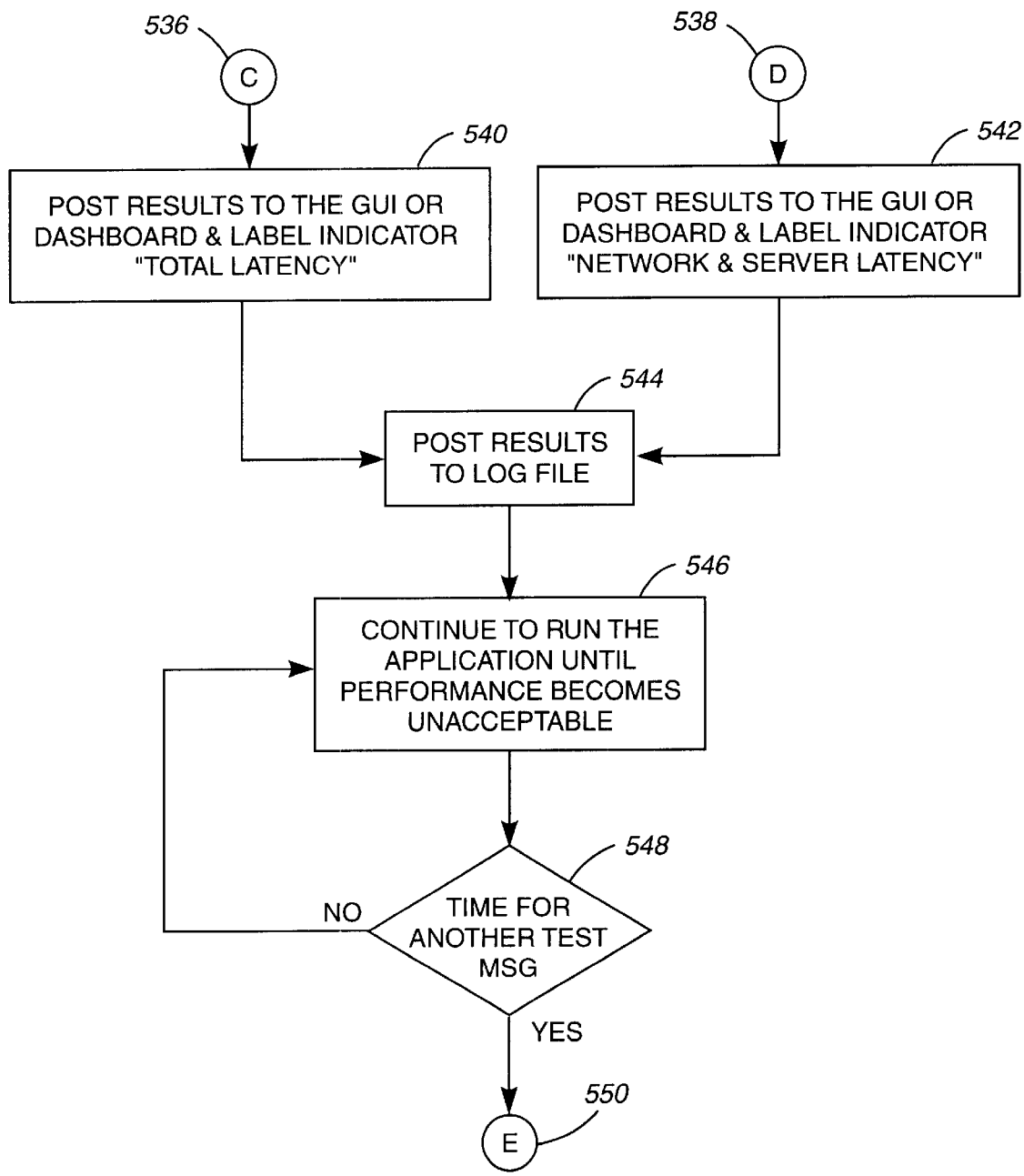

FIG. 5 illustrates an exemplary operational sequence 500 for network latency performance measurement. Starting with steps 502 and 504, a given application initiates a network latency measurement sequence. Although a single application is discussed in this example, it should be clear that multiple applications can similarly be handled within the scope and spirit of the present invention.

So working from the near end, or the originating Host, in step 506, the application sends a connection request to a foreign counterpart and in step 508 the far end Host application either answers "I'm here" or it doesn't in which case the near end shuts down or goes into its normal recovery procedures, which are steps 510 and 512.

Again, local rules for the application apply here. Assuming the connection was established, in step 514, we establish the application-to-application session using the application's handshaking ground rules and each application has its own set. Establishing sessions across a network are well-known techniques.

In step 516, the near end application loads the desired performance parameters into its GUI, or into its dashboard gauge program, to put up the time scale or beneath the good and marginal end indicators. So when the dashboard or the indicator is displayed, there is some sense of what's good and what's not good. Then, via exit point A 518 operation continues in FIG. 5-B. The GUI dashboard program, at step 520, generates and calibrates a display for this application. There are many types of graphic display programs and graphic display methods. Alternatively, you could have audible alarm indicators or color indicators that are part of a user interface to indicate to a user a certain condition of at least one application.

In Step 522, the near end application sends the Extended PING message to their far end counterpart application, or application component, being identified by the PORT ID address as was discussed above with reference to FIGS. 3-A and 3-B. In step 524, the lower level of the stack generates the ECHO message and sends it, and eventually you get an ECHO reply message or you don't. If you don't receive the reply, at step 526, we assume you've lost the connection, and in steps 528 and 530, you perform whatever recovery the application normally would do at this point in time. Following the exit point B 532 back to FIG. 5-A, the operational sequence returns into the shutdown step 512 and the end step 512 and we're finished.

Assuming that you the reply was received at step 526, then a response from the application or from a lower layer on the far end is checked, at step 534. This step handles whether the far end replies to the Extended PING command or the conventional PING command. And that will get you either at the exit point C 536 where the choice is application or at the exit point D 538 where the choice is lower layers.

Following the sequence for the application connector C, depicted in FIG. 5-C, we post the results on the GUI or the dashboard and we monitor the total latency 540 because by taking this exit out of step 534, we know that the response was for monitoring a far end application communication loop, and not only communication limited to the middle layers, and we have the true end-to-end latency.

Alternatively, if we left step 534 via the lower layer branch at exit point D 538, we would have come into FIG. 5-C and we posted the results in step 542 to the dashboard but we would label that to network and server, or middle layers of the server, latency, which is a different measurement than the application end-to-end latency.

In either case, we post the results of one or both of these measurements to the log file, in step 544, and then at step 546 we continue to run the application. Because we're continuing to run the application, we keep on sending PING commands, until we drop out at step 548 at time for another test message via connector E 550 to FIG. 5-B. This takes us through this whole procedure again sending the PING command or the Extended PING command, posting the results to the dashboard based on which leg on the decision step 534 we come out on. And if it's not yet time, we loop around until it is time to send another PING command. And we do this until the network performance becomes unacceptable or until the application ends whatever it is trying to do.

Figure 6:
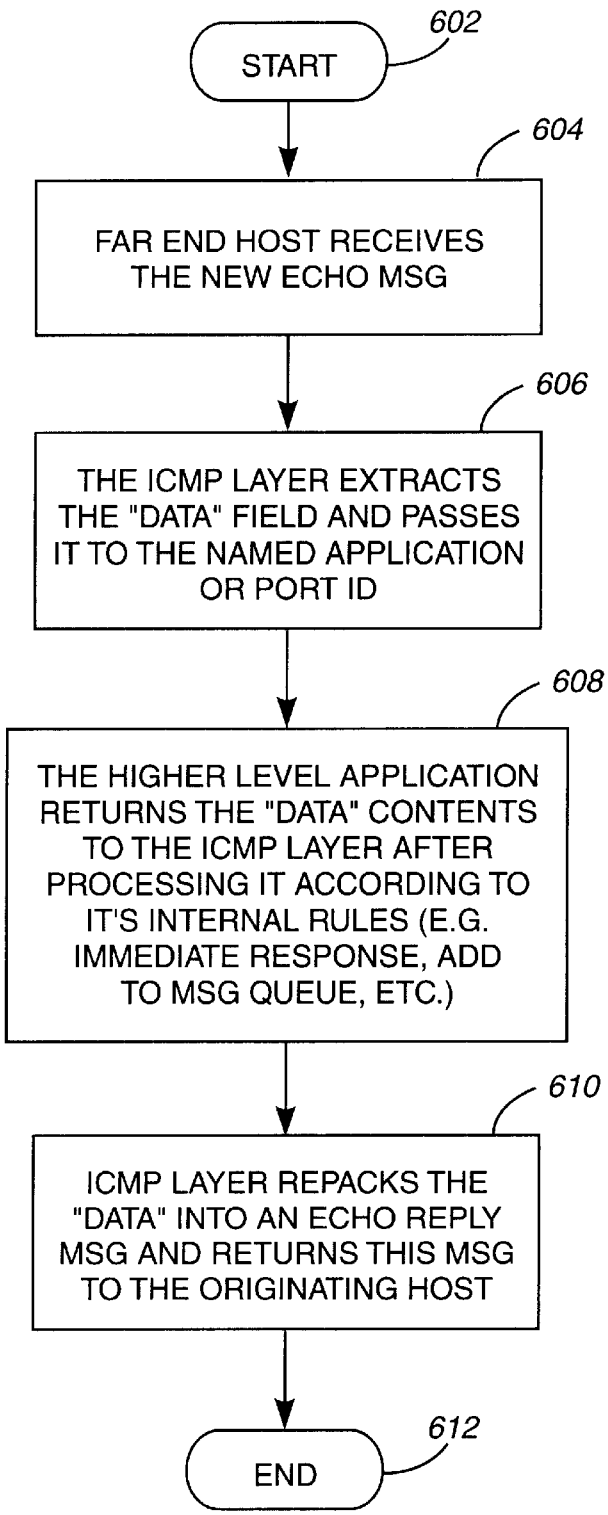

FIG. 6, illustrates an operational sequence 600 at a remote Host. Realizing the other end host is typically a mirror image of the near end host, we start with step 602. The far end host receives the ECHO message, at step 604, and the ICMP layer 208, as we discussed above with reference to FIG. 3-B, extracts the data field which is our new block that we just created in there. At step 606, the ECHO message information passes into the named application identified by the PORT ID, depending on how the computer system knows the applications that are running on it.

The higher level application, at step 608, receives that message and by its own processing rules it returns the data contents back to the ICMP layer, after processing it according to its rules. For example, it may process this message immediately, with a high priority message or it may put a low-priority message in the in-basket (queue) and when the application works its way down to the message it will process it. Therefore, the time delay is either more or less indicative of the actual workload of the application.

Again, local application rules apply, every programmer will do whatever they want to do in this step. But effectively, eventually, the ICMP layer gives it back, returns it as an ECHO reply message to the originating host, at steps 610 and 612.

And then, as has been discussed above, the originating host gets the ECHO reply message, creates the response to the originating application and then looks at the two time stamps and knows whether he's got the end-to-end or the network latency measurement and posts it to the dashboard.

Although specific embodiments of the invention have been disclosed, it will be understood by those having skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A communication system comprising:

a network;

a first Host computer system (First Host) coupled to the network, the First Host comprising an operating system platform for at least one application;

a second Host computer system (Second Host) coupled to the network, the Second Host comprising an operating system platform for at least one application;

a first application operational on the operating system platform in the First Host; and a second application operational on the operating system platform in the Second Host, the first application issuing an Extended PING command, including a field for identifying an application operational on the Second Host, for sending an Extended ECHO message, including a field for identifying an application operational on the Second Host, from the operating system platform in the First Host into the network and destined for reception by the second application in the Second Host to measure the network latency of communicating a message application-to-application across the network.

2. The communication system according to claim 1, wherein the second application in the Second Host, in response to receiving the Extended ECHO message, issues an Extended PING command for sending an Extended ECHO reply message from the operating system platform in the Second Host into the network and destined for reception by the first application in the First Host to measure the full loop-back network latency of communicating a message application-to-application across the network.

3. The communication system according to claim 2, wherein the first application causes a timer to be set at the First Host corresponding to issuing the Extended PING command, and the first application then compares the timer to a time when the first application receives the Extended ECHO reply message to measure a total loop-back time delay for message communication to measure the network latency of communicating a message application-to-application across the network.

4. The communication system according to claim 2, wherein the first application, in response to receiving the Extended ECHO reply message adjusts an application operational parameter to automatically adapt to a change in network latency performance for message communication by the application across the network.

5. The communication system according to claim 2, further comprising a user interface means for communicating network latency performance status information to a user of the communication system; and wherein the first application, in response to receiving the Extended ECHO reply message provides a measurement signal to the user interface means for communicating network performance status information to the user.

6. The communication system according to claim 5, wherein the user interface means communicates the network performance status information to the user by at least one of the following user interface functions a) display the network performance status information to the user, b) audibly alert the user to provide the network performance status information to the user, and c) provide audible speech signals to the user to provide the network performance status information to the user.

7. The communication system according to claim 6, wherein the user interface means displays the network performance status information to the user by at least one of a) displaying an analog gauge and needle representation to indicate a quality of performance for message communication and network latency by the relative angular position of the needle in the analog guage, b) digital readout display of network performance status information, c) color bar display for indicating network performance status information via color bars, d) coloring a background on a display screen to indicate network performance status information, and e) flashing a screen of a display to indicate network performance status information to a user.

8. A communication system comprising:

a network;

a first Host computer system (First Host) coupled to the network, the First Host comprising an operating system platform for at least one application;

a second Host computer system (Second Host) coupled to the network, the Second Host comprising an operating system platform for at least one application;

a first application operational on the operating system platform in the First Host; and a second application operational on the operating system platform in the Second Host, the first application issuing an Extended PING command for sending an Extended ECHO message from the operating system platform in the First Host into the network and destined for reception by the second application in the Second Host to measure the network latency of communicating a message application-to-application across the network, wherein the second application in the Second Host, in response to receiving the Extended ECHO message, issues an Extended PING command for sending an Extended ECHO reply message from the operating system platform in the Second Host into the network and destined for reception by the first application in the First Host to measure the full loop-back network latency of communicating a message application-to-application across the network, and wherein the first application issues a second Extended PING command for sending a second Extended ECHO message from the operating system platform in the First Host into the network and destined for reception by the operating system platform in the Second Host; and wherein the operating system platform in the Second Host, in response to receiving the second Extended ECHO message, sends a second Extended ECHO reply message from the operating system platform in the Second Host into the network and destined for reception by the first application in the First Host to measure the full loop-back network latency of communicating a message Host-to-Host across the network; and wherein the first application compares the full loop-back network latency of communicating a message application-to-application across the network to the full loop-back network latency of communicating a message Host-to-Host across the network to compare message communication delay from application processing to message communication delay from network processing.

9. A method for a communication system, the method comprising the steps of:

sending a first message, from a first application operating on a first Host computing system (First Host), into a communication network, the first message destined for reception by a second application operating on a second Host computing system (Second Host), wherein the first message comprises an Extended ECHO message, including a field for identifying an application operational on the Second Host, initiated by an Extended PING command, including a field for identifying an application operational on the Second Host;

receiving the first message from the communication network in the second application; and measuring the network latency of communicating the first message application-to-application across the network.

10. The method as recited for claim 9, further comprising the steps of:

sending a reply message, in response to receiving the first message, from the second application into the communication network;

receiving the reply message from the communication network in the first application; and measuring the full loop-back network latency of communicating the first message and the reply message via application-to-application communication across the network.

11. The method as recited for claim 10, further comprising the step of automatically adjusting an operation of the first application in response to the measuring the full loop-back network latency step.

12. The method as recited for claim 10, further comprising the step of presenting a network latency performance measurement information to a user in response to the step of measuring the full loop-back network latency.

13. The method as recited for claim 12, wherein the presenting step includes the step of displaying network latency performance measurement information to a user.

14. The method as recited for claim 12, wherein the presenting step includes the step of audibly indicating network latency performance measurement information to a user.

15. A computer readable medium including computer instructions for:

sending a first message, from a first application operating on a first Host computing system (First Host), into a communication network, the first message destined for reception by a second application operating on a second Host computing system (Second Host), wherein the first message comprises an Extended ECHO message, including a field for identifying an application operational on the Second Host, initiated by an Extended PING command, including a field for identifying an application operational on the Second Host;

receiving the first message from the communication network in the second application; and measuring the network latency of communicating the first message application-to-application across the network.

16. The computer readable medium of claim 15, further including computer instructions for:

sending a reply message, in response to receiving the first message, from the second application into the communication network;

receiving the reply message from the communication network in the first application; and measuring the full loop-back network latency of communicating the first message and the reply message via application-to-application communication across the network.

17. The computer readable medium of claim 16, further including computer instructions for:

automatically adjusting an operation of the first application in response to the measuring the full loop-back network latency instruction.

18. The computer readable medium of claim 16, further including computer instructions for:

presenting a network latency performance measurement information to a user in response to the instruction of measuring the full loop-back network latency.

19. The computer readable medium of claim 18, further including computer instructions for:

displaying the network latency performance measurement information to a user.

20. The computer readable medium of claim 18, further including computer instructions for:

audibly indicating network latency performance measurement information to a user.

* * * * *